United States Patent [19]

Genequand

[11] Patent Number: 4,692,016

[45] Date of Patent: Sep. 8, 1987

[54] PROCESS FOR ELECTROPHOTOGRAPHIC MATRIX PRINTING AND DEVICE FOR CARRYING OUT THE PROCESS

[75] Inventor: Pierre Genequand, Geneva, Switzerland

[73] Assignee: Fondation Suisse pour la Recherche en Microtechnique, Neuchatel, Switzerland

[21] Appl. No.: 839,911

[22] Filed: Mar. 14, 1986

[51] Int. Cl.⁴ .............................................. G03G 15/00
[52] U.S. Cl. ..................................... 355/1; 355/3 R; 355/8; 355/71; 355/14 R; 350/358; 358/300; 358/302
[58] Field of Search ................... 355/3 R, 14 R, 1, 8, 355/11, 71; 350/358, 353, 355; 358/302, 901, 902, 904, 300

[56] References Cited

U.S. PATENT DOCUMENTS

| | | | |
|---|---|---|---|
| 4,389,655 | 6/1983 | Baues | 355/1 X |
| 4,400,740 | 8/1983 | Traino et al. | 350/358 |
| 4,427,291 | 1/1984 | Day | 355/1 X |
| 4,447,126 | 5/1984 | Heidrich et al. | 355/1 X |
| 4,480,257 | 10/1984 | Hill | 355/1 X |
| 4,577,933 | 3/1986 | Yip et al. | 350/358 |
| 4,624,555 | 11/1986 | Tokuhara et al. | 355/71 |
| 4,641,950 | 2/1987 | Rongen et al. | 355/71 X |

*Primary Examiner*—A. C. Prescott
*Attorney, Agent, or Firm*—Frost & Jacobs

[57] ABSTRACT

A process for electrophotographic matrix printing and apparatus for carrying out this process, the apparatus comprising a plane assembly of modulating strips disposed alternately along two parallel lines, an optical light guide for guiding the light emitted by a virtual pinpoint light source in the form of two convergent light sheets respectively traversing the two lines of modulators, and a rotary drum whose lateral surface consists of a photosensitive support. The optical light guide is formed of a plate with plane parallel surfaces, bounded by three rims. The first rim has a toroidal form whose center corresponds to the position of the source; the second rim has a cylindro-parabolic form and the third rim comprises a dihedron whose edge is parallel to the plane faces of the guide. Writing can be effected line by line along a direction substantially parallel to the axis of rotation of the photosensitive support.

10 Claims, 12 Drawing Figures

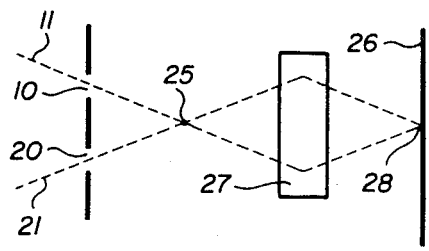
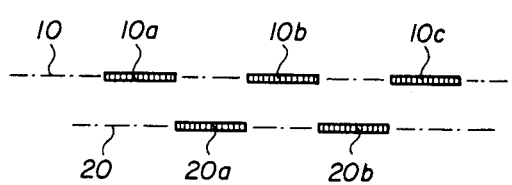
FIG. 1   FIG. 2
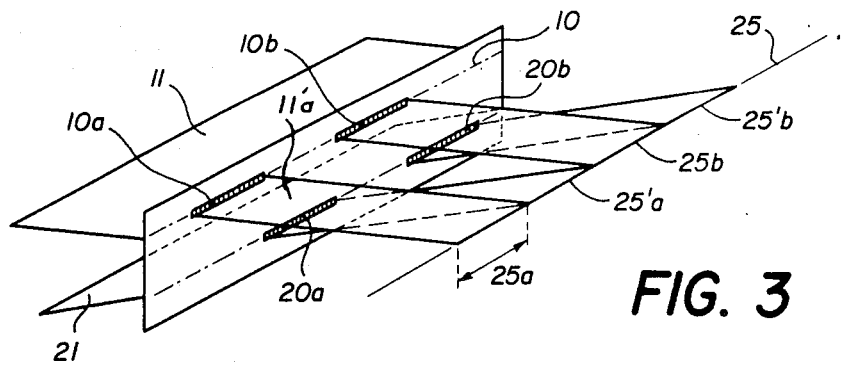
FIG. 3
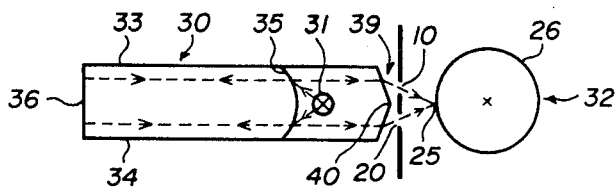
FIG. 4
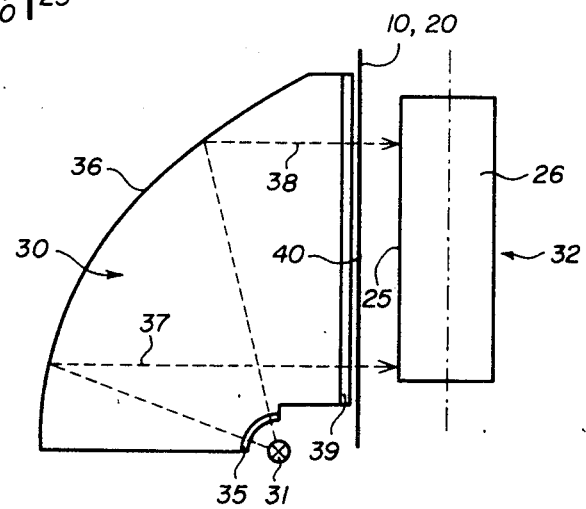
FIG. 5

PROCESS FOR ELECTROPHOTOGRAPHIC MATRIX PRINTING AND DEVICE FOR CARRYING OUT THE PROCESS

BACKGROUND OF THE INVENTION

The present invention relates to a process for electrophotographic matrix printing, wherein a light beam is projected onto an array of electroptical opticalmodulators disposed along line segments and wherein this beam is recombined, after passage through said modulators, in one continuous line on a photosensitive support in motion.

The invention also relates to a device for carrying out this process, comprising a virtual pinpoint light source, an array of electrooptical modulators disposed along line segments and an optical guide for conducting light from the source to the modulator array in such a manner that the light traversing these modulators is recombined in a continuous line on a photosensitive drum in rotation.

Electrophotographic printers are based on selectively illuminating the photosensitive surface of a rotary drum by optoelectronic means. Writing is generally effected line by line in a direction substantially parallel to the drum axis. The succession of these lines, when the drum is in rotation, forms a matrix image of the graphic document to be reproduced.

The best known operating principle calls for a laser beam intensity modulated by an accousto-optical device and reflected by a rotating polygonal mirror so as to rapidly scan the writing line. This system, which has the advantage of great flexibility of speed and resolution, presents various drawbacks, among which are bulkiness linked to the great focal distances of the lens means for concentratating the beam on the scanned line, the cost of said lens means which must compensate focal length variations between the center and the extremities of the line, as well as the cost of making a high-precision mirror rotating at high speed.

It has been proposed to reduce these difficulties by replacing the scanning laser beam by a line of discrete elecroptical elements, modulated in parallel. These elements may be active sources such as photoemitting diodes or passive components such as light modulators.

Such systems are intrinsically much more compact than laser printers and have the adavantage of comprising no mobile part. However, to obtain a sufficient resolution, of the order of 10 to 15 points per mm, the number of elements necessary for realizing a line is very high, in the order of 2000 to 3000 for a standard line of 210 mm. These elements must each be addressed to an electronic control circuit. Such a density of elements and circuits necessarily implies, for economical production, resorting to the techniques for fabricating integrated circuits. Now, it is known that the latter are cut out in the form of chips from wafer of a limited size which is currently situated at about 100 mm. In addition, the individual size of a chip is much smaller than that of a wafer, in order that the surface may be well filled on one hand and that the presence of manufacturing flaws which are statistically inevitable in a number proportional to the surface, may not cause the yield in utilizable chips to fall below a reasonable rate.

With regard to the electrooptical modulating elements, the maximum size of a monolithic line segment can hardly exceed 30 to 40 mm. Thus, to realize a complete line of 210 mm, one must have six to eight segments juxtaposed end to end. This presents the problem of continuity of the writing line. Each segment in effect physically presents an inactive border, consisting of the sawing and encapsulating edge, which interrupts the line by a dead space on juxtaposition.

Another problem, in the case of passive modulator lines, is that of conveying the light to be modulated up to the electrooptical elements.

These two problems have not been solved in a satisfactory manner. For example, a printing head with magnetooptical modulators is known, which is described in the article "Advances in Laser and Electroptic Printing Technology" by R. A. Sprague, J. C. Urbach and T. S. Fisli, published in the journal "Laser Focus" of October 1983, on page 101 and illustrated more particularly in FIG. 11, wherein light is conducted from a concentrated source to a row of modulator segments by means of a fiber-optical converter with fibers disposed in fan-shape. The aligned but discrete images of the line segments are then focussed slightly enlarged on the drum, so as to reform a continuous line by means of a series of large-diameter objectives, each corresponding to a segment. Both the fan-shaped sheaf of fibres consisting of several thousands of fibers to be aligned facing the modulators as well as the series of objectives constitute costly auxiliary equipment. The row of objectives is moreover bulky and adjustment of the images of the line segments is quite delicate.

SUMMARY OF THE INVENTION

The present invention has the object of reducing the various mentioned drawbacks by providing a printing process of the above-mentioned type as set forth hereinafter wherein the modulator line segments are alternately placed along two parallel lines, and wherein the incident light beam is divided into two convergent light sheets, each of which is projected onto a line of segments, and wherein the spacing of the segments and the direction of the light rays of each sheet are defined in such a manner that the succession of rays derived from each modulator, when going over the successive segments alternately from one line to the other, forms, on the line of convergence of said two sheets, a continuous succession of images of the modulators of the array.

According to one mode of carrying out this process, the line of convergence of the two convergent light sheets is formed directly on the photosensitive surface. According to another mode, the image of the line of convergence of the two convergent light sheets is projected onto the photosensitive surface by means of an optical projection device.

The device for carrying out this process as set forth in the claims is characterized in that the optical guide, for conducting light from the pinpoint light source to the modulator array, consists of a transparent plate which has a refractive index greater than 1, provided with two plane parallel polished faces which define its thickness, the periphery of this plate being defined by at least three rims, of which a first rim forms a toroidal polished surface disposed in such a manner that the light rays of the virtual pinpoint source, placed at the center of symmetry of this surface, are refracted within the plate along rays parallel to said plane faces and along directions whose projections on a plane parallel to said faces converge in a point corresponding to the projection of the pinpoint source onto this plane, of which a second rim forms a cylindro-parabolic surface perpendicular to said plane faces and of which the focal axis passes through the pinpoint light source, this polished surface being covered with a reflecting layer which reflects the light derived from said source along a beam of parallel rays, and of which a third rim forms a dihedron with an edge parallel to the two polished faces perpendicular to the rays derived from the parabolic edge, this dihedron refracting said rays along two convergent light sheets.

According to a preferred embodiment, the modulators consist of a plane assembly of modulating strips, each of which contains a segment of the line of modulators, these strips being placed in such a manner that the segments are alternately disposed along two parallel lines at the edge of the dihedron of the third rim of the optical guide, the plane of the assembly being perpendicular to the plane faces of the transparent plate, the position and the length of the segments being such that the perpendicular projection of these segments onto the other line coincides exactly with the spaces available between the segments of this other line.

According to a particularly advantageous embodiment, the line of convergence of the light sheet elements derived from the modulator line segments coincides with a generating line of a cylindrical circular surface forming the photosensitive surface of the rotary drum.

According to a variant, this device comprises a plane screen substantially parallel to the modulator array, this screen being disposed in the plane of the line of convergence of the two light sheets and presenting an opening in the form of a slit positioned along the line of convergence, in such a manner as to only allow passage of the rays of the two sheets directly traversing the modulators and to exclude the light diffused on passage through the modulators.

According to another advantageous embodiment of the device according to the invention, the wave guide has a refractive index greater than or equal to 1.5 and its second rim comprises two polished surfaces whose intersecting edge forms a parabola whose focus corresponds to the location of the pinpoint light source, this parabola being situated in the plane of symmetry of the guide and these two surfaces being perpendicular to each other all along the parabola and symmetrical with respect to the plane of symmetry of the wave guide. In this embodiment, the second rim reflects the light rays by total reflection.

When, for various reasons, it is not desired to place the modulator assembly in the immediate proximity of the photosensitive surface, a variant of the device according to the invention provides for optical projection means arranged to form, on the photosensitive surface of the drum the image of a virtual line corresponding approximately to the line of convergence. According to a preferred embodiment, this optical device comprises a plane mirror disposed on the path of one of the two convergent sheets, immediately behind the line of convergence and oriented so as to reflect the intercepted sheet with a beam width which is sufficiently small with respect to the other sheet so that the two sheets may be admitted into a linear lens means with an index gradient.

The present invention, its characteristics and principal advantages will be better understood with reference to the description of an example of an embodiment and to the accompanying drawings.

DRAWINGS

FIG. 1 represents a schematic elevation view illustrating the principle of the process according to the invention.

FIG. 2 represents a schematic plan view of the two lines of modulators utilized for carrying out the process according to the invention.

FIG. 3 represents a schematic perspective view illustrating the principle of the process according to the invention.

FIG. 4 is an elevation view of the device according to the invention.

FIG. 5 is a plan view of the device according to FIG. 4.

DESCRIPTION

Figure 6:
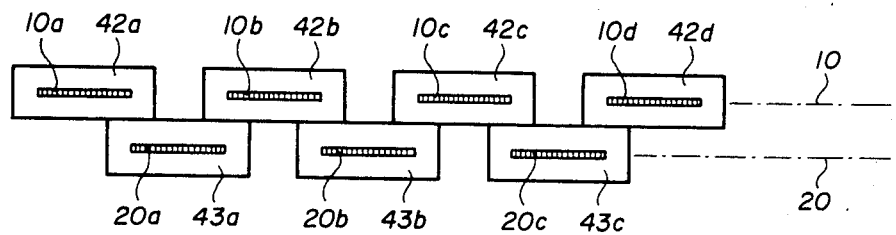
FIG. 6 represents a front view of an embodiment of a modulator strip assembly.

With reference to FIGS. 1 to 3, the principle underlying the process according to the invention is based on the utilisation of two lines 10 and 20 of modulators having the form of segments 10a, 10b, 10c, etc., 20a, 20b, 20c, etc. respectively disposed on the lines 10 and 20 of an incident light beam divided into two light sheets 11 and 21 which converge on a line of convergence 25, and of a photosensitive support 26 on which an image 28 of the line of convergence 25 is formed by means of an optical projection system 27.

As is more particularly shown in FIGS. 2 and 3, the modulator segments, distributed over the two lines 10 and 20, are offset from one line to the other. The sheet element 11'a, corresponding to the incident sheet 11 and emerging from the modulator 10a, thus forms a first section 25a of the line of convergence 25. The second section 25'a, corresponding to the modulator 20a, is derived from the sheet 21. The third section 25b, corresponding to the modulator 10b, is again derived from the sheet 11, and so on. The modulators 10a, 20a, 10b, 20b, etc, are disposed alternately on the two lines in such a manner that the segments 25a, 25'a, 25b, 25'b, etc. form a continuous line of convergence 25. In this manner, the line of writing on the photosensitive support is uninterrupted. This writing line may coincide with the line of convergence when one forms this line of convergence directly on the photosensitive support or with the image of the line of convergence when one uses an optical projection system 27 as is shown in FIG. 1.

The device illustrated in FIGS. 4 to 7 comprises an optical guide 30 for conducting light from a pinpoint source 31, through the array of modulators disposed along the two lines 10 and 20, to a rotary drum 32 carrying the photosensitive support 26. The optical guide 30 consists of a transparent plate with a refractive index greater than 1, made for example of a thermoformable material known commercially under the denomination "Plexiglass". This plate comprises two plane parallel polished faces 33 and 34 which limit its thickness. Its contour is defined by three rims, of which a first rim is a toroidal polished surface 35 whose center of symmetry corresponds to the pinpoint source 31, in such a manner that the light rays emitted by this light source are refracted within the plate along rays parallel to the plane faces 33 and 34, and along directions whose projections onto a plane parallel to said plane faces 33 and 34 coincide in a point corresponding to the projection of the pinpoint source 31 onto this plane. The second rim forms a cylindro-parabolic surface 36 which is perpendicular to the two plane faces and whose focal axis passes through the pinpoint source. This surface is polished and is covered with a reflecting layer which reflects the light derived from the source 31 along a beam of parallel rays 37, 38. The third rim forms a dihedron 39 with an edge 40 parallel to the two plane faces 33 and 34, and perpendicular to the rays 37, 38 reflected by the second rim. This dihedron refracts said rays along the two convergent sheets 11 and 21. The line of convergence 25 of these two light sheets 11 and 21 coincides with a generating line of the photosensitive surface 26 forming the surface of the drum 32.

The converging light sheets 11 and 21 are projected onto the modulator strip lines 10 and 20 which constitute a modulator strip assembly such as represented in FIGS, 6 and 7.

In the example of FIG. 6, the strips 42a, 42b, 42c, 42d etc. each comprise a segment of modulators 10a, 10b, 10c, 10d etc. and the strips 43a, 43b, 43c, 43d, etc. each comprising a segment of modulators 20a, 20b, 20c, 20d, etc. The strips 42a, 42b, etc. are disposed in such a manner that the corresponding modulator segments 10a, 10b, etc. are aligned along the line 10. The strips 43a, 43b, etc. are disposed in such a manner that the modulator segments 20a, 20b, etc. are aligned along the line 20. The two lines 10 and 20 are parallel to the edge 40 of the dihedron 39. The plane of assembly is perpendicular to the two plane faces 33 and 34 of the transparent plate 30. The position and the length of the modulator segments on one line, for example the position and the length of the segment 10b on the line 10, are such that the perpendicular projection of these segments onto the other line coincide exactly with the space available between the segments of this other line, for example the space available between the segments 20a and 20b of the line 20.

Figure 7:
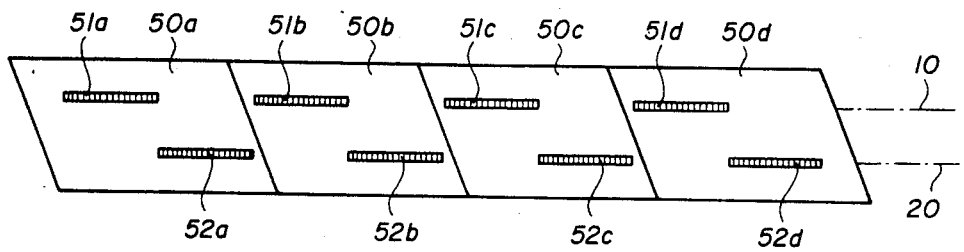
FIG. 7 represents another embodiment of a modulator strip assembly.

In the example illustrated in FIG. 7, each modulatr strip 50a, 50b, etc. comprises a couple of modulator segments 51a, 52a; 51b, 52b, etc. whose elements are respectively offset on the two lines 10 and 20.

Figure 8:
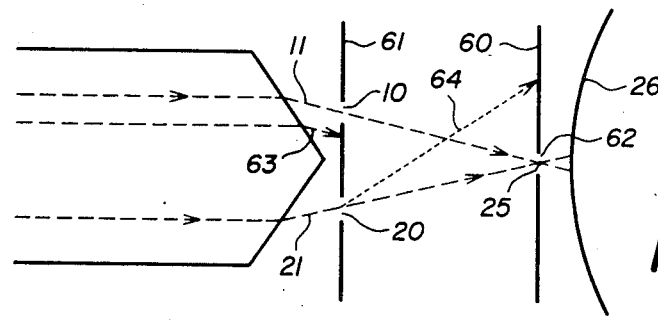
FIG. 8 represents a partial sectional view of a device according to the invention equipped with a screen for filtering diffused light.

FIG. 8 illustrates an improvement of the device illustrated in FIG. 4, which serves to improve the resolution in the direction of rotation of the drum. For this purpose, a plane screen 60 is placed between the plane 61 containing the modulator strip assembly disposed along the two lines 10 and 20 and the photosensitive support 26. This screen 60 is placed in the plane of the line of convergence 25 of the two light sheets 11 and 21 and comprises in this location a slit 62 serving to provide passage of light derived from these sheets after its passage through the modulating segments. The light illustrated by the rays 63, which is not directly derived from one of these sheets, is stopped by the modulating strip assembly. The light which is dispersed by defective collimation or is diffused by the modulating segments and is illustrated by the ray 64, is stopped by the screen 60. It thus seems evident that addition of the screen 60 allows the resolution of the system to be improved.

Figure 9:
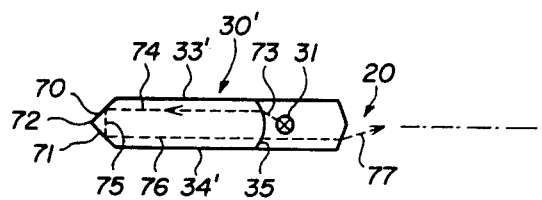
FIGS. 9 and 10 represent elevation and plan views of another embodiment of the light guide of the device according to the invention.
Figure 10:
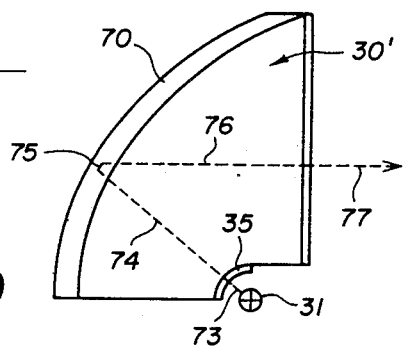

A variant of the device of FIGS. 4 and 5 is illustrated in FIGS. 9 and 10, where the reflecting layer covering the rim 36 of the plate 30 is replaced by a structure which reflects the light rays by total reflection. The second rim of the wave guide 30' consists of two polished surfaces 70 and 71 of which the intersecting edge 72 has the form of a parabola whose focus corresponds to the location of the light source 31 and which is situated in the plane of symmetry of the wave guide 30'. These two surfaces 70 and 71 are perpendicular to one another all along the edge 72 and are symmetrical with respect to the plane of symmetry of the optical guide 30'. As is shown in the figures, a ray 73, emitted by the source 31 which penetrates into the optical guide 30' through the toroidal surface 35, passes parallel to the surface 33' of this guide along a ray 74 which is reflected along a ray 75, reflected by the surface 71 along a ray 76 parallel to the surface 34' of the guide 30', and deviated by one of the faces of the dihedron of exit along a ray 77 illustrating the lower sheet 20.

Figure 11:
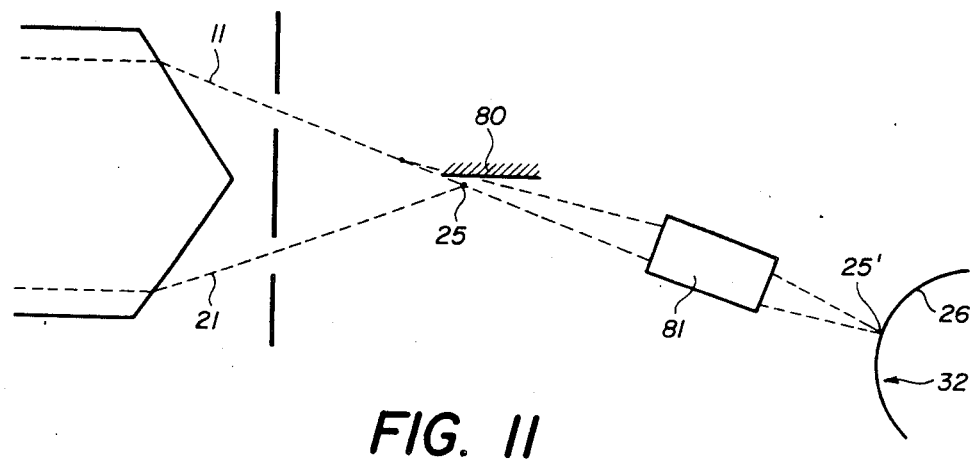
FIG. 11 is a view in profile of another embodiment of the device according to the invention equipped with optical reflecting means.

For various reasons, one may have to space the modulator assembly away from the photosensitive surface. One may provide for this purpose an optical projection device such as is illustrated in FIG. 11. In this variant, a plane mirror 80 is disposed in one of the convergent light sheets, for example the sheet 21, immediately behind the line of convergence 25. This plane mirror is oriented so as to reflect the intercepted sheet with a beam width which is sufficiently small with respect to the other sheet, so that the two sheets may be admitted into linear lens means 81 with an index gradient (for example lens means commercially available under the denomination Selfoc), disposed in such a manner as to form, on the photosensitive surface 26 of the drum 32, the image of a virtual line 25' corresponding approximately to the line of convergence 25.

Figure 12:
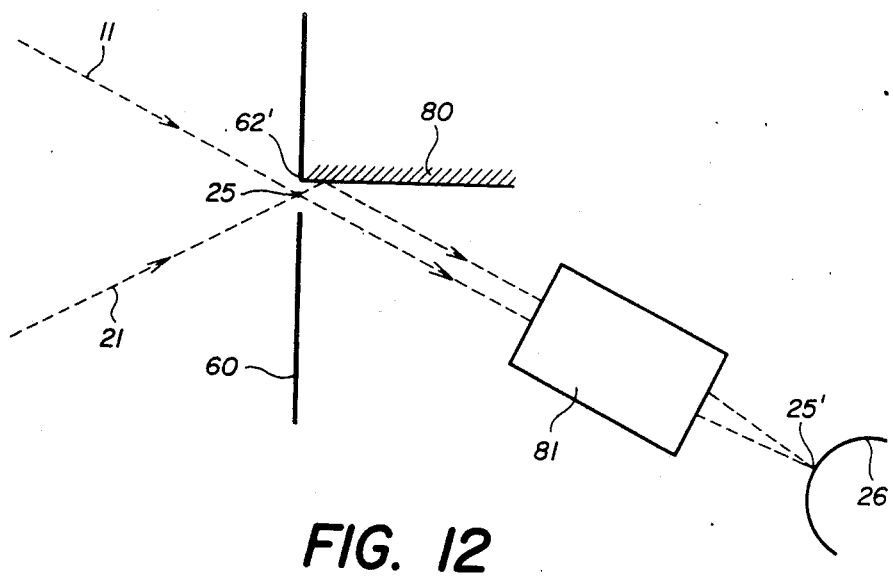
FIG. 12 is a partial view in profile of the device according to the invention provided with a filtering screen combined with an optical reflecting mirror.

The plane mirror 80 may also be combined with a plane screen 60, as represented in FIG. 12, in such a manner that the slit 62 presents a common edge 62' with the mirror 80. This arrangement allows an equal light flow to be obtained between the two sheets after correction by the mirror.

Although it is not limited to a particular type of light modulator, the device described above will advantageously incorporate microshutter line segments, consisting for example of microstructures capable of stopping or allowing passage of light, such as are described in the article "New micromechanical display using thin metallic films" by M. A. Cadman, A. Perret, F. Porret, R. Vuilleumier and P. Weiss, published in the journal "Electron Device Letters" EDL-4 No. 1 of January 1983, which article is incorporated by reference herein.

The present invention is not limited to the described embodiments but may comprise different variants and may present various aspects which are related to the described device in a manner obvious to those skilled in the art.

I claim:

1. Process for electrophotographic matrix printing, wherein a light beam is projected onto an array of electrooptical modulators disposed along line segments, wherein this beam is recombined, after passage through said modulators, in one continuous line on a photosensitive support in motion, wherein the modulator line segments are placed alternately along two parallel lines, the incident light beam is divided into two convergent light sheets, each of which is projected onto one line of segments, and wherein the spacing of the segments and the direction of the light rays of each sheet are defined in such a manner that the succession of rays derived from each modulator, when going over the successive segments alternately from one line to the other, forms, on the line of convergence, of the two sheets, a continuous succession of images of the modulators of the array.

2. Process according to claim 1, wherein the line of convergence of the two convergent light sheets is formed directly on the photosensitive surface.

3. Process according to claim 1, wherein the image of the line of convergence of the two convergent light sheets is projected on the photosensitive surface by means of an optical projection device.

4. Apparatus for for electrophotographic matrix printing comprising a virtual pinpoint light source, an array of electrooptical modulators disposed along line segments and an optical guide, for conducting light from the light source to the modulator array, in such a manner that the light traversing these modulators is recombined in a continuous line on a rotating drum carrying a photosensitive support, wherein said optical guide comprises a transparent plate having a refractive index greater than 1, provided with two plane parallel polished faces which define its thickness, the periphery of said plate being defined by at least three rims, of which a first rim forms a toroidal polished surface disposed in such a manner that the light rays of the virtual pinpoint source, placed at the center of symmetry of this surface, are refracted within the plate along rays parallel to said plane faces and along directions whose projections onto a plane parallel to said faces converge in a point corresponding to the projection of the pinpoint source onto this plane, a second rim of which forms a cylindro-parabolic polished surface perpendicular to said two plane faces the focal axis of which passes through the pinpoint light source, said polished surface being covered with a reflecting layer which reflects the light derived from said source along a beam of parallel rays, and a third rim of which forms a dihedron with an edge parallel to said two plane polished faces and perpendicular to the rays derived from the parabolic edge, said dihedron refracting said rays along two convergent light sheets.

5. Apparatus according to claim 4, wherein said modulators comprise a plane array of modulating strips, each of which contains at least one segment of the line of modulators, said strips being placed in such a manner that the segments are disposed alternately along two lines parallel to the edge of said dihedron of the third rim of the optical guide, the plane of said array being perpendicular to said two plane faces of said transparent plate, and wherein the position and the length of the segments on one of these lines are such that the perpendicular projections of these segments onto the other line coincide exactly with the spaces available between the segments of this other line.

6. Apparatus according to claim 5, wherein the line of convergence of the light sheet elements derived from the modulator line segments coincides with a generating line of a cylindrical circular surface forming the photosensitive support of the rotating drum.

7. Apparatus according to claim 4, including a plane screen substantially parallel to the modulator array, said screen being disposed in the plane of the line of convergence of said two light sheets and presenting an opening in the form of a slit positioned along the line of convergence so as to allow passage only of the rays of said two sheets directly traversing the modulators, and to exclude light which is uncollimated or diffused on passage in the modulators.

8. Apparatus according to claim 4, wherein said optical guide has a refractive index at least equal to 1.5, and wherein said second rim comprises two polished surfaces the intersecting edge of which forms a parabola whose focus corresponds to the location of the virtual pinpoint light source, this parabola being situated in the plane of symmetry of the guide and said two surfaces being perpendicular to one another all along the parabola and symmetrical with respect to the plane of symmetry of said optical guide.

9. Apparatus according to claim 4, including an optical projection device, comprising a plane mirror disposed on the path of said two convergent light sheets, immediately behind the line of convergence and oriented in such a manner as to reflect the intercepted sheet with a sufficiently small beam width with respect to the other light sheet so that these two sheets may be admitted into linear lens means with an index gradient, said lens means being disposed in such a manner as to form, on the photosensitive support of the drum, the image of a virtual line approximately corresponding to the line of convergence.

10. Apparatus according to claim 9, including a plane screen combined with said mirror, said plane screen having a slit for passage of light derived from said two light sheets, said screen and said mirror having a common edge.

* * * * *